(12) United States Patent
Jaluthariya et al.

(10) Patent No.: US 9,641,038 B2
(45) Date of Patent: May 2, 2017

(54) ELECTRICAL MACHINE AND A METHOD FOR CONTROLLING STIFFNESS IN A STATOR WINDING OF THE ELECTRICAL MACHINE

(75) Inventors: Mukesh Kumar Jaluthariya, Jaipur (IN); Neelima Tailor, Beawar (IN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 290 days.

(21) Appl. No.: 14/348,607

(22) PCT Filed: Aug. 13, 2012

(86) PCT No.: PCT/EP2012/065786
§ 371 (c)(1),
(2), (4) Date: Apr. 10, 2014

(87) PCT Pub. No.: WO2013/053512
PCT Pub. Date: Apr. 18, 2013

(65) Prior Publication Data
US 2014/0246946 A1    Sep. 4, 2014

(30) Foreign Application Priority Data
Oct. 14, 2011    (EP) .................................... 11185234

(51) Int. Cl.
*H02K 3/50* (2006.01)
(52) U.S. Cl.
CPC ......... *H02K 3/505* (2013.01); *H02K 2213/09* (2013.01); *Y10T 29/49009* (2015.01)
(58) Field of Classification Search
CPC .. H02K 3/38; H02K 3/46; H02K 3/50; H02K 3/505

USPC ............ 310/260, 51, 91, 195, 209, 214, 270
See application file for complete search history.

(56) References Cited

U.S. PATENT DOCUMENTS

| 3,924,149 | A | * | 12/1975 | Estrada | ................... | H02K 3/505 |
| | | | | | | 310/260 |
| 4,037,126 | A | * | 7/1977 | Brennan | ................ | H02K 3/505 |
| | | | | | | 310/260 |
| 4,950,934 | A | * | 8/1990 | Holly, III | ............... | H02K 3/505 |
| | | | | | | 310/214 |
| 5,969,460 | A | * | 10/1999 | de Pietro | ............... | H02K 3/505 |
| | | | | | | 310/26 |
| 2003/0135980 | A1 | | 7/2003 | Ichikawa et al. | | |
| 2004/0007937 | A1 | * | 1/2004 | Stallone | ................. | H02K 3/505 |
| | | | | | | 310/260 |

(Continued)

FOREIGN PATENT DOCUMENTS

| CN | 1224267 A | 7/1999 |
| CN | 1433122 A | 7/2003 |
| DE | 2909314 | 9/1980 |

OTHER PUBLICATIONS

Klemmwinkel; Ersatzteilhandel Stehlik: Klemmwinkel; URL: http://www.zweiradteileshop.de/elektrik/scheinwerfer/p1571_klemmwinkel-f-frontring-scheinwerfer-simson-sr50-sr80.html; XP002671694;; 2012; DE; Mar. 15, 2012.

*Primary Examiner* — Michael Andrews
(74) *Attorney, Agent, or Firm* — Beusse Wolter Sanks & Maire

(57) ABSTRACT

An electrical machine is provided. The electrical machine includes a stator having at least one winding, and a mechanical assembly acting on the winding for providing a radial force at the winding for controlling a stiffness of the winding.

14 Claims, 4 Drawing Sheets

(56) References Cited

U.S. PATENT DOCUMENTS

2004/0032182 A1   2/2004  Rowe et al.
2005/0029898 A1*  2/2005  Hediger ................ H02K 3/505
                                                        310/260
2005/0092880 A1   5/2005  Lutze et al.

* cited by examiner

ELECTRICAL MACHINE AND A METHOD FOR CONTROLLING STIFFNESS IN A STATOR WINDING OF THE ELECTRICAL MACHINE

CROSS REFERENCE TO RELATED APPLICATIONS

This application is the US National Stage of International Application No. PCT/EP2012/065786 filed Aug. 13, 2012, and claims the benefit thereof. The International Application claims the benefit of European Application No. EP11185234 filed Oct. 14, 2011. All of the applications are incorporated by reference herein in their entirety.

FIELD OF INVENTION

The present invention relates to electrical machines and more particularly to electrical generators including a stator with at least one winding.

BACKGROUND OF INVENTION

An electrical machine such as an electrical generator includes a rotor and a stator surrounding the rotor. The stator includes one or more windings. The stator also includes a main portion which terminates at a first end and a second end. Windings in the end extend outwardly from the main portion as outer and inner end windings. These windings are also referred to as top and bottom end windings. As the rotor rotates within the stator, electrical current flows through the windings which results in the generation of electrical power.

The windings are subjected to vibrations and stresses during the operation of the electrical generator. The vibrations in the windings may result in a fault or electrical short circuit that may cause structural deformation in the generator.

As will be appreciated, the natural vibration frequency of end windings in the present electrical generators is typically out of exclusion zone, which is about 120 Hz and is typically twice the operating frequency of the generator which is 50 Hz or 60 Hz. During the operation of the generator, a resulting high vibration and noise in the generator is caused due to possibility of resonance. The high vibrations result in failure of functionality of the components in the generator.

Currently, to increase the natural vibration frequency of the windings a wicking resin is applied on a banding which makes it relatively tight this results in high natural frequency which is greater than 120 Hz. However, after some time the resin starts to break off and the banding becomes loose, which again lowers the natural vibration frequency of the end winding.

SUMMARY OF INVENTION

It is therefore an object of the present invention to provide an arrangement to increase the stiffness of the winding resulting in higher natural vibration frequency.

This object is achieved by an electrical machine according to an independent claim and a method for controlling a stiffness of stator winding in an electrical machine according to another independent claim.

The electrical machine includes a stator with at least one winding and a mechanical assembly for providing a radial force at the winding for controlling a stiffness of the winding. By having an arrangement of mechanical assembly to provide a force on the winding, the stiffness of the winding is increased. This increased stiffness of the winding results in an increase in natural vibration frequency of the winding which does not cause high vibration in the generator due to absence of resonance.

In one embodiment, the assembly includes a movable part configured to apply the radial force at the winding. The movable part provides liberty to apply a required amount of force at the winding.

In another embodiment, a stationary part is placed on a first surface of the winding, which facilitates uniform application of the force on the winding.

In one embodiment, the movable part applies radial force on the stationary part. The force from the movable part is uniformly distributed through the stationary part resulting in uniform force being applied to the winding.

In another embodiment, the winding includes a core winding and an end winding of the stator. At the end windings the affect due to vibrations is very high which results in high vibrations in the generator.

A support ring is placed on a second surface of the winding to secure the winding and prevent their deformation, which could result in the winding contacting the rotor.

In one embodiment, the assembly is coupled to a support unit located on the first side of the winding. Coupling the mechanical assembly to support unit allows the assembly to be located at a desired location in the stator, and also to be integrated within the stator.

The movable part of the assembly is a shaft which transmits the torque to the other components which cannot be connected directly due to the distance. The shaft allows relative movement which also determines the amount of force to be applied at the winding.

The shaft is a camshaft which enables transfer of force based on the rotation of the cam. By using a camshaft the amount of force transferred to the winding would depend on the amount of rotation of the cam.

A force application arrangement is used for applying the force on the assembly in case enough distance is not available for the application of the force by the assembly itself.

In one embodiment, a hydraulic arrangement is used for applying force. The hydraulic arrangement has the ability to apply force in an easy way, independent of the distance between the assembly and the winding without the need of mechanical gears or levers. Additionally, use of hydraulic arrangement enables online monitoring of force to be applied to the assembly and in turn at the winding.

In another embodiment, a nut bolt arrangement is used as a force application arrangement. This is a simple and low cost design and does not have an issue with electrical clearance requirement.

In another embodiment, an L-shaped bracket is used as the movable part of the assembly and the force application arrangement acts on the on the L-shaped bracket such that the L-shaped bracket is moved when the force application arrangement is activated. Such an arrangement requires use of few components, less installation time and simple design.

In another embodiment, a stud spring arrangement is used. Such an arrangement allows a required tightening and loosening of stud based on the amount of force required at the winding.

In another embodiment, a plurality of windings and a plurality of mechanical assemblies are used, wherein at least one assembly is assigned to one respective winding, the assembly acts on the corresponding winding for providing a radial force at the winding for controlling a stiffness of the winding.

BRIEF DESCRIPTION OF THE DRAWINGS

The above-mentioned and other features of the invention will now be addressed with reference to the accompanying drawings of the present invention. The illustrated embodiments are intended to illustrate, but not limit the invention. The drawings contain the following figures, in which like numbers refer to like parts, throughout the description and drawings.

DETAILED DESCRIPTION OF INVENTION

Embodiments of the present invention relate generally to an electrical machine such as, but not limited to an electrical generator which may be a turbine driven electrical power generator, which includes a rotor and a stator surrounding the rotor, and also to an electrical motor.

Figure 1:
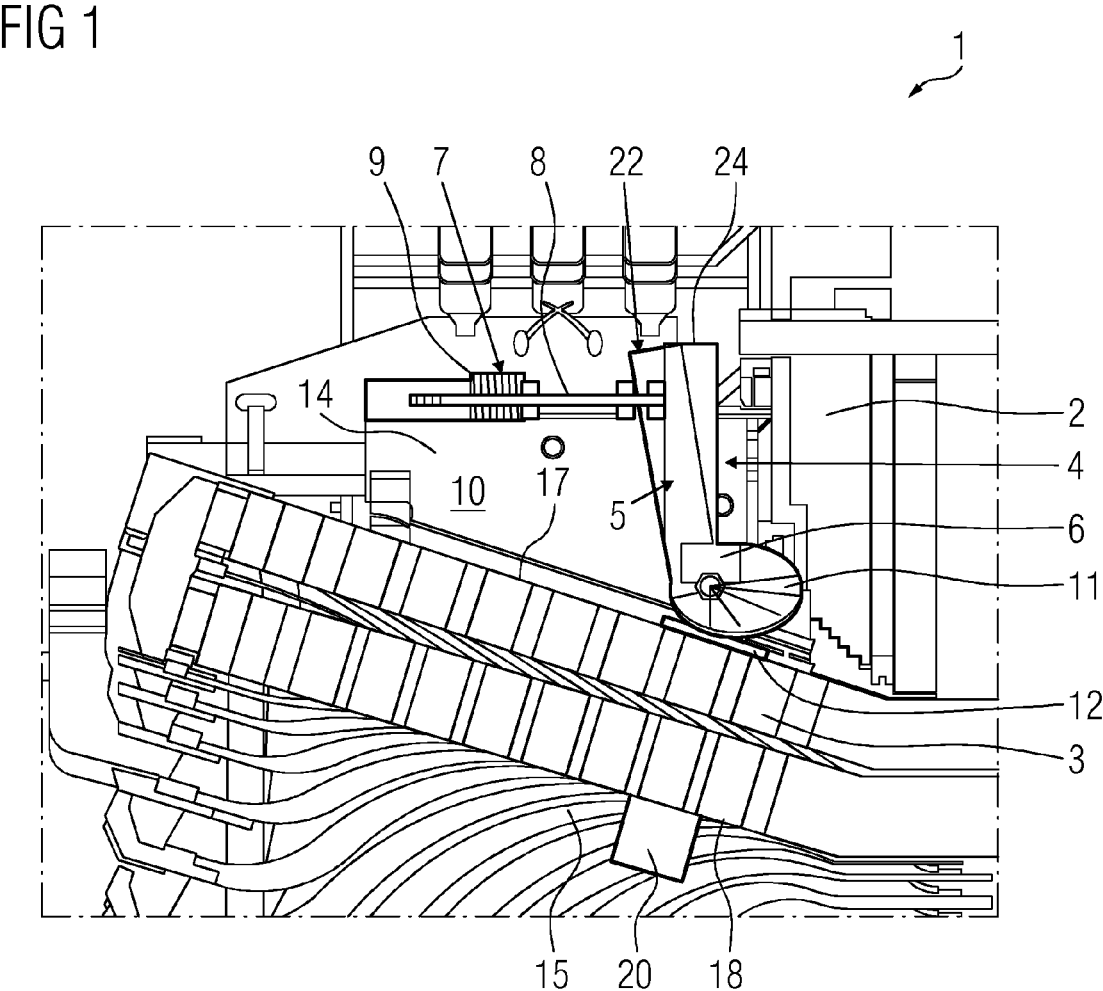
FIG. 1 is a diagram illustrating a section of an electrical machine with an assembly depicting stator windings in accordance with aspects of the present technique.

FIG. 1 illustrates a section of an electrical machine such as a generator 1. The generator 1 includes a stator 2 having one or more winding 3 arranged in a main portion (not shown in FIG. 1) and terminating as end winding. These end windings extend outwardly from the main portion of the stator 2. It may be noted that the winding 3 includes a core winding at the main portion and end winding at the end portion of the stator 2. The stator 2 includes a mechanical assembly 4 having a movable part 5. The movable part 5 of the assembly 4 is configured to provide a force at the winding 3 as will be described hereinafter.

In the presently contemplated configuration, the movable part 5 is a shaft, such as a camshaft 6. However, different kind of shafts may be used as the movable part 5 based upon the design and requirements. A force application arrangement 7 is configured to apply a force on the mechanical assembly 4. The force application arrangement 7 may include a hydraulic arrangement, a nut bolt arrangement, a stud spring arrangement or the like.

As will be appreciated, the force applied on the mechanical assembly 4 by the force application arrangement 7 may be either by a push or a pull mechanism to the mechanical assembly 4.

Furthermore, the stator 2 includes a support unit 10 on a first side 14 of the winding 3 for coupling the mechanical assembly 4. In one embodiment, the support unit 10 may be a brace for coupling the assembly 4.

In accordance with aspects of the present technique, the force application arrangement 7 in the present configuration depicted in FIG. 1 includes a stud spring arrangement. As illustrated a stud 8 and a spring 9 arrangement applies a force on the camshaft 6. More particularly, the stud 8 may be tightened or loosened which would in turn apply a force on the camshaft 6. Additionally, it may be noted that the stud 8 is mechanically coupled to the camshaft 6, thus any movement in the stud 8 results in a movement of camshaft 6.

It may be noted that the force application arrangement 7 applies force on the camshaft 6, which moves the camshaft 6 and thus causes a rotation in a cam 11. A stationary part 12 such as a pressure plate of the assembly 4 is pressed towards the winding 3 due to the movement of the cam 11. This movement of the cam 11 and subsequently the force applied on the stationary part 12 results in an inward radial force on the winding 3. The inward radial force reduces a gap between the winding elements resulting in increase in the stiffness of the winding 3. The increased stiffness in the winding 3 would result in increase in the natural vibration frequency of the winding 3.

More particularly, the force application arrangement 7, which is a stud spring arrangement in FIG. 1, pushes the camshaft 6 from a first position 22 to a second position 24. The movement of the camshaft 6 in turn causes a rotation in the cam 11 which results in a force on the stationary part 12 of the mechanical assembly 4 due to the profile of the cam 11. As an example, the profile of the cam 11 may be elliptical or oval. The cam 11 exerts force on the stationary part 12 which in turn provides a uniform inward radial force at the winding 3.

In accordance with aspects of the present technique, the stationary part 12 of the assembly 4 is placed adjacent to a first surface 17 of the winding as depicted in FIG. 1. A support ring 20 is placed adjacent to a second surface 18 of the winding 3. The support ring 20 may be a segmented ring which supports the winding 3 and maintains the shape of the winding 3.

The support ring 3 may be made from a material which does not deform on applying force. As an example, the support ring 20 is made from glass which does not deform on applying force.

Furthermore, it may be noted that the force application arrangement 7 may be a hydraulic arrangement. The hydraulic arrangement would enable online control of the amount of force to be applied on the mechanical assembly 4 by adjusting the pressure in the hydraulic arrangement.

Figure 2:
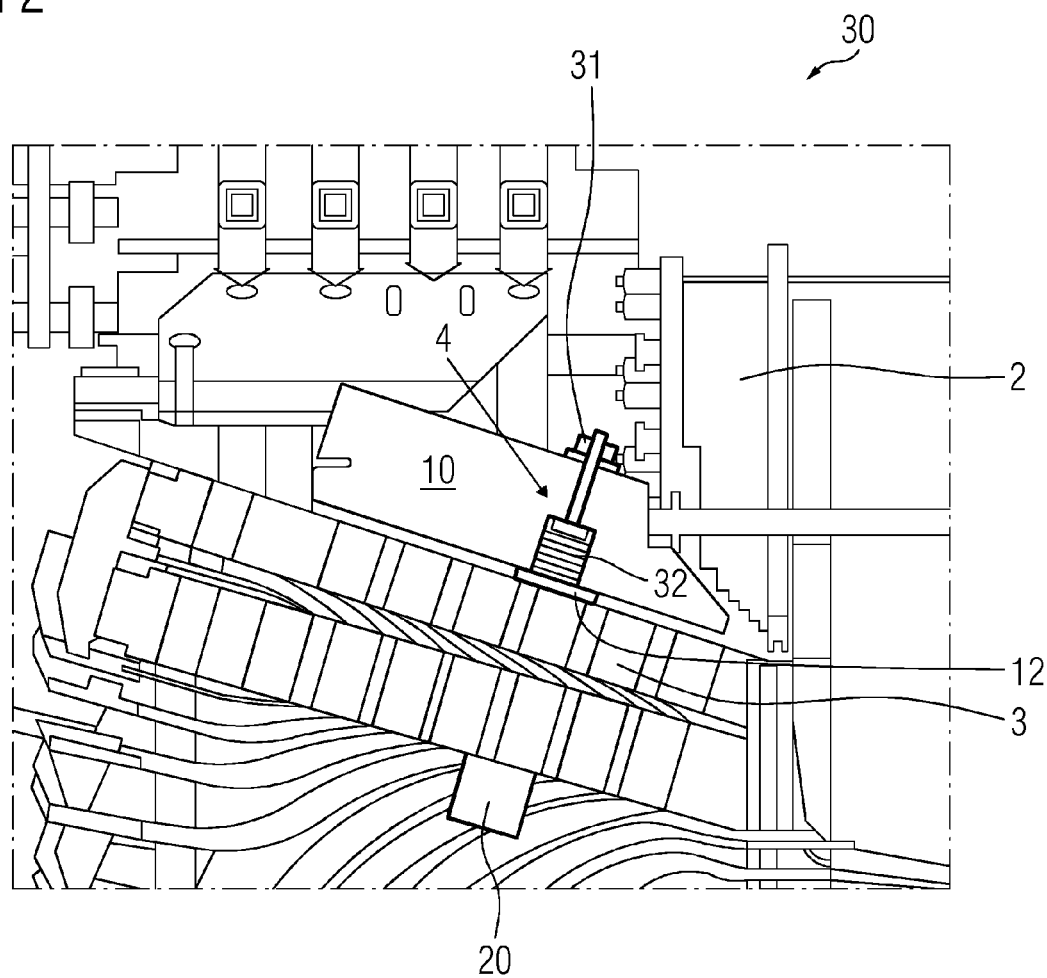
FIG. 2 is a diagrammatical illustration depicting another embodiment of the assembly and stator windings of the electrical machine.

Referring now to FIG. 2, a diagrammatical illustration depicting another embodiment of the mechanical assembly 4 for the stator winding is presented. The mechanical assembly 4 in the presently contemplated configuration includes a stud spring arrangement. The stud spring arrangement is supported by the brace 10. A tightening of the stud 31 causes the spring 32 to compress which in turn applies an inward radial force on the stationary part 12 which is a pressure plate in the present configuration. The inward radial force pushes the winding 3 inward causing the elements to come close to each other which results in increase in the stiffness of the winding 3. The support ring 20 is also present in the present embodiment to provide support to the winding 3 and hence maintain the shape of the winding 3.

Figure 3:
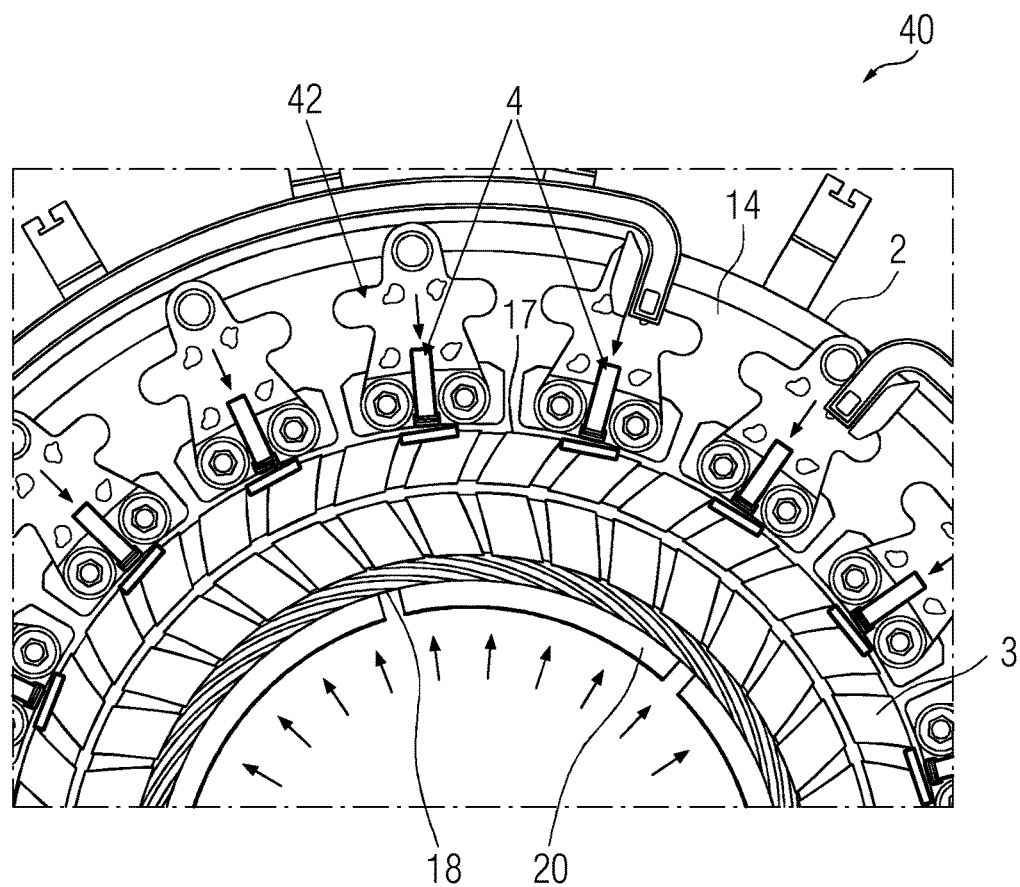
FIG. 3 illustrates a front view of the stator of FIG. 2 depicting the assembly of the electrical machine.

FIG. 3 is a diagrammatical illustration depicting a front view 40 of the stator 2 with winding 3 depicting the mechanical assembly 4 of FIG. 2. The mechanical assemblies 4 are arranged circumferentially on the first side 14 of the winding 3. In the present arrangement the windings 3 are the end windings present at the excitation end of the stator 2. It may be noted that the assembly 4 are arranged based on the amount of force needed on the windings 3. As an example, the mechanical assembly 4 may be used to apply force on every alternate winding in the stator 2. In another example, the mechanical assembly 4 may be present for each winding, wherein at least one assembly 4 is assigned to one respective winding 3, the mechanical assembly 4 acting on the corresponding winding 3 provides a radial force at the winding for controlling a stiffness of the winding 3.

A support unit 42 is depicted as providing the support to the mechanical assembly 4. The mechanical assembly 4 is coupled to the support unit 42 with a nut and bolt for example.

Furthermore, the stator 2 includes the support ring 20 to support the winding 3 and maintain the shape of winding 3 by preventing the inward radial force applied by the mechanical assembly 4 to deform the winding 3.

Figure 4:
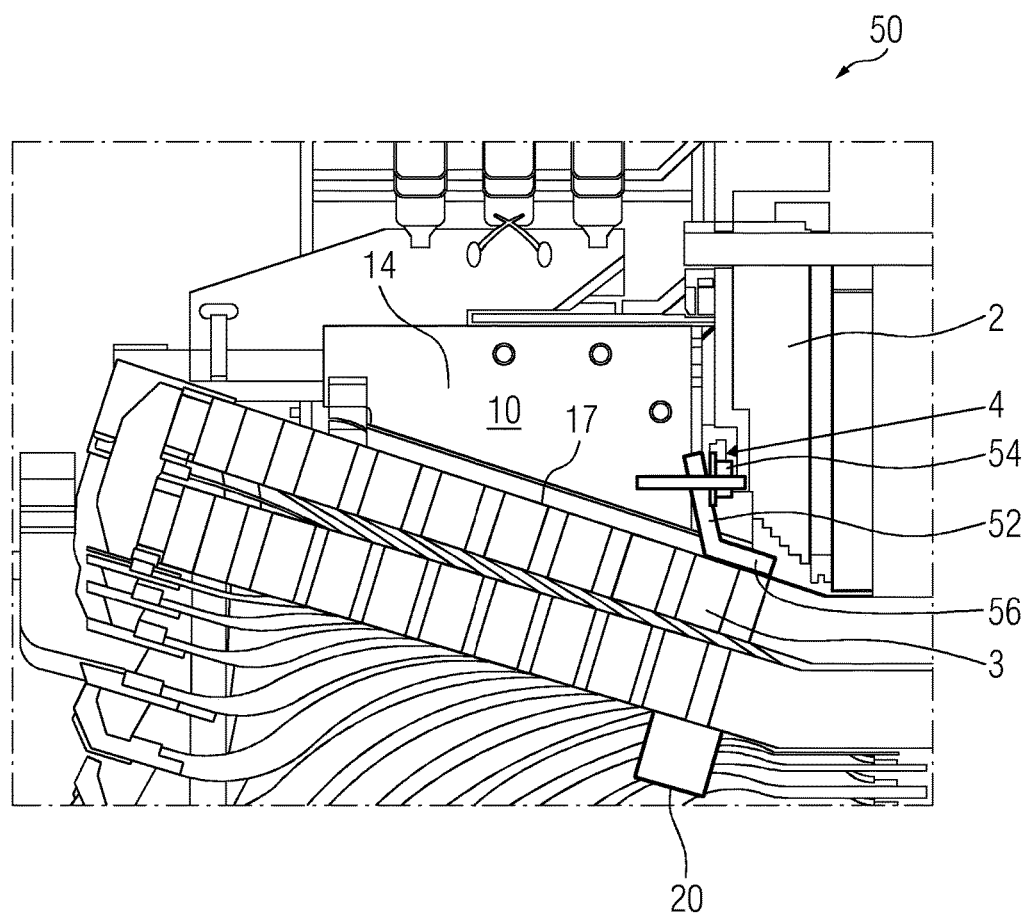
FIG. 4 illustrates another embodiment of the assembly for stator winding, in accordance with aspects of the present technique.

Referring now to FIG. 4, a sectional view 50 depicting another embodiment of the mechanical assembly 4 for stator winding 3 is presented. The mechanical assembly 4 includes a movable part, which is a bracket 52. In the presently contemplated configuration the bracket 52 is an L-shaped bracket located adjacent to the first surface of the winding. The L-shaped bracket 52 is present on the first side 14 of the winding. A nut 54 is coupled to the L-shaped bracket 52 to apply a force on the L-shaped bracket 52 when the nut 54 is tightened.

Tightening of the nut 54 towards the brace 10 causes the L-shaped bracket 52 to move, a portion 56 of the L-shaped bracket 52 proximal to the first surface 17 of the winding 3 causes a resultant radial force on the winding 3 thereby increasing the stiffness of the winding.

It may further be noted that the movement of the L-shaped bracket 52 would depend on the amount of torque applied to the nut 54, which would in turn determine the amount of radial force applied on the winding 3.

A method aspect of the present technique for controlling the stiffness of the stator winding in an electrical machine such as the generator 1 includes providing a radial force at a first side 14 of the winding 3 through the mechanical assembly. Further, the method includes providing the support ring 20 on the second side 15 of the winding 3 for maintaining the shape of the winding 3.

Although the invention has been described with reference to specific embodiments, this description is not meant to be construed in a limiting sense. Various modifications of the disclosed embodiments, as well as alternate embodiments of the invention, will become apparent to persons skilled in the art upon reference to the description of the invention. It is therefore contemplated that such modifications can be made without departing from the embodiments of the present invention as defined.

The invention claimed is:

1. An electrical machine comprising:
a stator having at least one winding, and
a mechanical assembly acting on the winding for providing a radial force at the winding for controlling a stiffness of the winding, wherein a movable part of the mechanical assembly comprises a shaft, wherein the shaft is a camshaft with a cam, wherein a profile of the cam is elliptical or oval.

2. The electrical machine according to claim 1, wherein the movable part of the mechanical assembly is configured to apply the radial force at the winding.

3. The electrical machine according to claim 2, wherein the movable part applies the radial force on a stationary part placed on a first surface of the winding.

4. The electrical machine according to claim 3, wherein a support ring is placed adjacent to a second surface of the winding.

5. The electrical machine according to claim 1, wherein the winding comprises an end winding and a core winding and the mechanical assembly is arranged to provide the radial force at the end winding.

6. The electrical machine according to claim 1, wherein the mechanical assembly is coupled to a support unit located on a first side of the winding.

7. The electrical machine according to claim 1, further comprising a force application arrangement for applying a force on the movable part of the mechanical assembly.

8. The electrical machine according to claim 7, wherein the force application arrangement comprises a stud spring arrangement.

9. The electrical machine according to claim 7, wherein the force application arrangement comprises a hydraulic arrangement.

10. The electrical machine according to claim 7, wherein the force application arrangement comprises a nut arrangement or a nut bolt arrangement.

11. The electrical machine according to claim 1, comprising a plurality of windings and a plurality of mechanical assemblies, wherein at least one mechanical assembly is assigned to one respective winding, the mechanical assembly acting on the corresponding winding for providing a radial force at the winding for controlling a stiffness of the winding.

12. A method for controlling a stiffness of stator winding in an electrical machine comprising:
applying a radial force at a first side of the stator winding via a shaft of a mechanical assembly, and
maintaining a shape of the stator winding via a support ring placed adjacent to a second side of the stator, wherein the shaft comprises a camshaft comprising a cam, wherein a profile of the cam is elliptical or oval.

13. The method of claim 12, further comprising applying the radial force to an end winding of the stator winding.

14. An electrical machine comprising:
a stator having at least one winding;
a mechanical assembly acting on the winding for providing radial force at the winding for controlling stiffness of the winding, wherein a movable part of the mechanical assembly comprises a L-shaped bracket; and
a force application arrangement that acts on the L-shaped bracket such that the L-shaped bracket applies the radial force when the force application arrangement is activated, wherein the force application arrangement comprises a nut arrangement or a nut bolt arrangement, and wherein the nut is coupled to the L-shaped bracket in such a manner that a portion of the L-shaped bracket proximal to the winding causes the radial force on the winding when the nut is tightened.

* * * * *